United States Patent
Meusel et al.

(10) Patent No.: US 6,928,886 B2
(45) Date of Patent: Aug. 16, 2005

(54) ARRANGEMENT FOR THE DETECTION OF RELATIVE MOVEMENTS OF TWO OBJECTS

(75) Inventors: Peter Meusel, Fürstenfeldbruck (DE); Johannes Dietrich, Gilching (DE); Bernd Gombert, Grafrath, DE (US)

(73) Assignee: Deutsches Zentrum fur Luft-und Raumfahrt e.V., Koln (DE)

( * ) Notice: Subject to any disclaimer, the term of this patent is extended or adjusted under 35 U.S.C. 154(b) by 123 days.

(21) Appl. No.: 10/234,676

(22) Filed: Sep. 4, 2002

(65) Prior Publication Data

US 2003/0070496 A1 Apr. 17, 2003

(30) Foreign Application Priority Data

Sep. 5, 2001 (DE) .......................... 101 43 489

(51) Int. Cl.[7] ................................. G01L 3/14
(52) U.S. Cl. ................................. 73/862.324
(58) Field of Search ..................... 73/862.041–862.046, 73/862.324, 862.628, 862.381, 865.4, 862.642, 862.44; 344/20; 250/229, 221, 208.6; 414/5; 345/156, 157, 158

(56) References Cited

U.S. PATENT DOCUMENTS

| | | | |
|---|---|---|---|
| 3,535,923 A | | 10/1970 | Martorana et al. |
| 3,628,394 A | | 12/1971 | Kealinge et al. |
| 3,915,015 A | * | 10/1975 | Crane et al. ............... 73/865.4 |
| 3,921,445 A | | 11/1975 | Hill et al. |
| 4,178,799 A | | 12/1979 | Schmieder et al. |
| 4,577,513 A | | 3/1986 | Harwood et al. |
| 4,589,810 A | | 5/1986 | Heindl et al. |
| 4,763,531 A | | 8/1988 | Dietrich et al. |
| 4,785,180 A | | 11/1988 | Dietrich et al. |
| 5,117,102 A | * | 5/1992 | Mitchell ..................... 250/229 |
| 5,295,399 A | * | 3/1994 | Grant et al. ........... 73/862.043 |
| 5,365,799 A | * | 11/1994 | Okada ................... 73/862.041 |
| 5,591,924 A | * | 1/1997 | Hilton ................... 73/862.043 |
| 5,610,343 A | * | 3/1997 | Eger et al. ............. 73/862.628 |
| 6,550,346 B2 | * | 4/2003 | Gombert et al. ....... 73/862.043 |
| 6,583,783 B1 | * | 6/2003 | Dietrich et al. ............. 345/158 |
| 6,769,312 B2 | * | 8/2004 | Meyer et al. .......... 73/862.042 |

FOREIGN PATENT DOCUMENTS

| | | |
|---|---|---|
| DE | 1773870 A1 | 1/1972 |
| DE | 2727704 A1 | 1/1979 |
| DE | 3240251 A1 | 5/1984 |
| DE | 3611336 C2 | 11/1988 |
| DE | 29901998 U1 | 4/2000 |
| DE | 10034569 A1 | 1/2002 |
| EP | 0117334 A2 | 9/1984 |
| EP | 0240023 B1 | 8/1990 |

OTHER PUBLICATIONS

"Elektronik über alles", Industrie–Anzeiger 31/32/1987 (1987).

* cited by examiner

*Primary Examiner*—Max Noori
*Assistant Examiner*—Octavia Davis
(74) *Attorney, Agent, or Firm*—Pierce Atwood; Kevin M. Farrell

(57) ABSTRACT

An arrangement for the detection of relative movements of two objects with four measuring cells as vertical measuring device for the detection of a relative movement perpendicular to an imaginary plane, with the measuring cells being arranged in such a manner that their vertical projections onto the plane are arranged at an identical angular distance from each other about a centre. Further, a force and/or moment sensor with a first board and a second board which are elastically connected with each other and movable relative to one another.

16 Claims, 4 Drawing Sheets

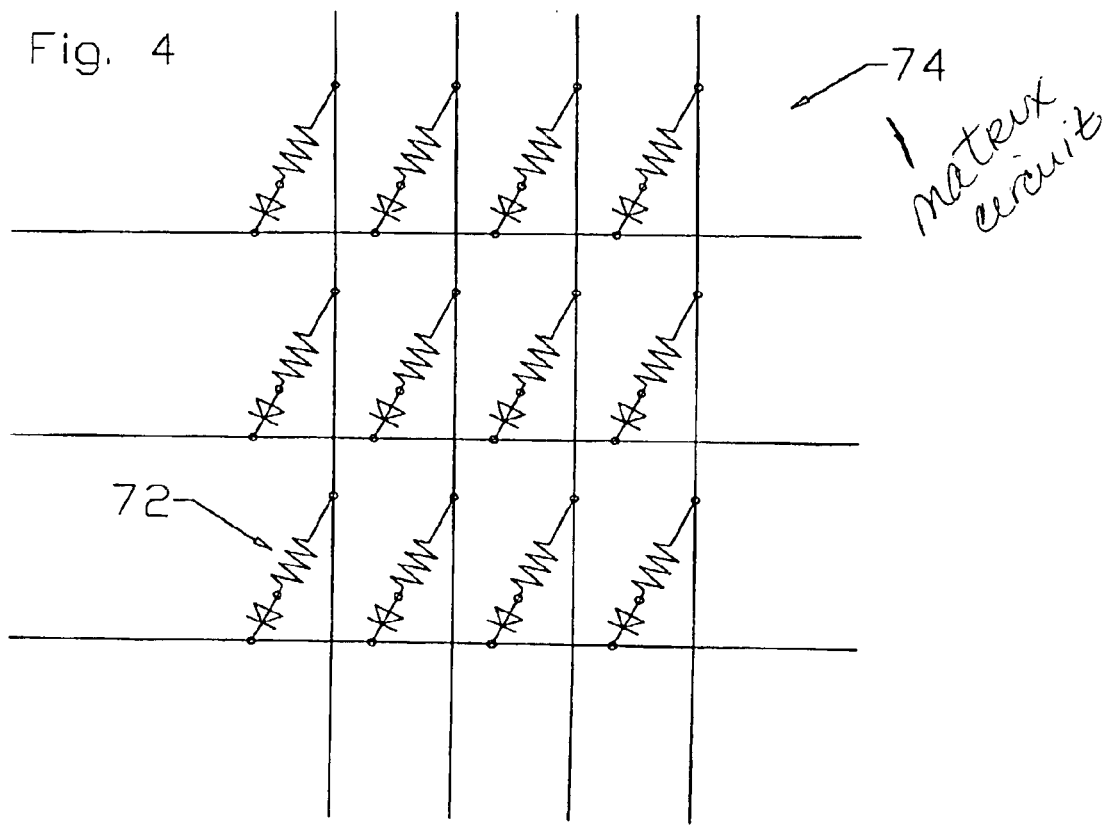

ARRANGEMENT FOR THE DETECTION OF RELATIVE MOVEMENTS OF TWO OBJECTS

BACKGROUND OF THE INVENTION

1. Field of the Invention

The present invention relates to an arrangement for the detection of relative movements of two objects as well as a force and/or moment sensor which utilizes such an arrangement. The invention further relates to potential applications for the force and/or moment sensor.

2. Description of the Related Art

In the state of the art, both arrangements for the detection of relative movements of two objects as well as force and moment sensors are known in a plurality of designs.

DE 36 11 336 C2 discloses a force and torque sensor which measures all six possible force and torque components in the Cartesian coordinate system by means of strain gauges. The apparatus consists of two spoke wheels arranged one above the other with four spokes each and a total of 20 strain gauges which are wired with one another. The complicated design of the sensor leads to high material and construction expenses. In addition, the rigidity of the arrangement is limited, which excludes many, in particular, industrial applications.

From EP 0 240 023 B1 an optoelectronic arrangement accommodated in a plastic ball is known into which six components, i.e. three displacements and three angular rotations can be input simultaneously. The arrangement has the advantage of a simple design because does not need more than six measuring cells which are arranged at equal angular distances from one another in a single plane. Three measuring cells measure movements in one plane, and three other measuring cells measure movements perpendicular to this plane. The employment of optoelectronic measuring cells ensures reproducibility, reliability, and freedom from wear. On the other hand, however, the corresponding six displacements and angular rotations in Cartesian coordinates must be computed first by means of a microcontroller, which necessitates additional expenditures. Depending on the data word width processed by the microcontroller, rounding errors can also occur so that the precision of the resultant values is below the original measuring values.

The pre-filed, post-published DE 100 34 569.7 A1 discloses a device for the detection of relative movements of one object, which essentially utilises the optoelectronic arrangement from EP 0 240 023 B1. The device is suited, in particular, for the detection of high forces and torques as they frequently occur in industrial applications. For this purpose the device comprises an intermediate part from an elastomer or a cast resin, which is arranged between an input and an output flange. Although this device can already accommodate high forces and torques, no protection against overload is provided which can result in the destruction of the device, in particular of the optoelectronic arrangement. The intermediate part is subjected to the most severe wear. Nevertheless, no means is provided which informs the user on a potential failure of the intermediate part or compensates such a failure. Incidentally, this device has the same drawbacks as the arrangement known from EP 0 240 023 B1.

Further documents which do not claim to be exhaustive and which show the technical background of the invention are: DE 32 40 251 A1; DE 27 27 704; U.S. Pat. Nos. 3,921,445; 3,628,394.

PROBLEM ON WHICH THE INVENTION IS BASED

In the past, primarily systems which are based on optoelectronic arrangements with six measuring cells have been successful in many industrial applications as well as in research and development because the required performance can be achieved with relatively moderate expenditure. Together with the technical advance in the fields of application, however, the requirements with respect to precision and speed of the measuring systems have also increased. The term speed in this context refers to the number of measurements which can be made within a certain time interval. It is primarily determined by the speed of the microcontroller and the program executed on same. Apart from an enhanced performance, a price as low as possible is demanded at the same time.

On the basis of the state of the art, the present invention is thus based on the object to create an arrangement for the detection of relative movements of two objects, which complies with the increased requirements with respect to precision and speed at material and construction expenditures as low as possible. The invention is further based on the object to create a force and/or moment sensor which, again at material and construction expenditures as low as possible, complies with the increased requirements with respect to precision and speed.

INVENTIVE SOLUTION

For the solution of this object, the invention teaches an arrangement for the detection of relative movements of two objects, which includes four measuring cells (20) a vertical measuring means for the detection of a relative movement perpendicular to an imaginary plane (24) with the measuring cells (20) being arranged in such a manner that their vertical projections onto the plane (24) are arranged in an identical angular distance from each other about a centre (26). Furthermore, it teaches a force and/or moment sensor which includes a first board (60) and a second board (62), with the first board (60) and the second board (62) being elastically connected with each other and movable relative to one another, characterised by a means for the detection of movements of the second board (62) relative to the first board (60).

CONSTRUCTION AND DEVELOPMENT OF THE INVENTIVE SOLUTION

On the basis of the above mentioned state of the art, in particular of the arrangement of only six optoelectronic measuring cells, which has proven the most advantageous one in practice, it is obvious to meet the higher requirements with respect to precision and speed with this arrangement as the basis by the selection of adequately high-quality components, in particular more precise measuring cells and a faster microcontroller.

According to the present invention, however, a different approach is pursued. Instead of the usual three measuring cells, four measuring cells are employed as a vertical measuring means for the detection of a relative movement perpendicular to an imaginary plane, with the measuring cells being arranged in such a manner that their vertical projections onto the plane are arranged about a centre at an equal angular distance from each other. One would expect that this complicated solution causes higher costs than the known solution because both the number of components as well as the construction and manufacturing expenditure increases.

The solution is, however, surprisingly considerably more economical because considerably lower-priced components with the same precision and speed can be employed, which more than compensates the above cost disadvantages. The reason is that besides the increase in precision due to the higher number of measuring cells, another effect can be utilised. Since the four measuring cells by virtue of the arrangement are already aligned along Cartesian coordinates, a conversion to Cartesian coordinates in the microcontroller becomes unnecessary, and the associated disadvantages with respect to precision and speed do no longer apply.

The present invention makes also use of the fact that in many measuring tasks forces in two principal directions which are perpendicular to one another have to be measured. The inventive has a particularly high measuring accuracy in those directions along which the measuring cells are arranged. Due to the fact that these directions are also perpendicular to one another because of the use of four measuring cells, a particularly precise measurement can be achieved simply by arranging the measuring cells along the principal directions.

In a preferred embodiment the inventive arrangement has been developed to an arrangement for measuring all the six movement and rotation directions by providing four additional measuring cells as a horizontal measuring means for the detection of a relative movement in the plane, with the measuring cells being arranged in such a manner that their vertical projections onto the plane are arranged about a centre at an equal angular distance from each other. Each measuring cell of the horizontal measuring means measures movements which occur in the plane perpendicular to the privileged direction which extends through the respective measuring cell and the centre. The term "privileged direction" is defined as follows:

A privileged direction of a horizontal or vertical measuring means is given through an imaginary arrow which lies in a plane in which or perpendicular to which, respectively, the measuring cells of the horizontal measuring means or vertical measuring means, respectively, detect relative movements. The arrow originates from the vertical projection of a measuring cell onto said plane and points to the centre about which the projections of the measuring means are arranged at an equal angular distance.

A particularly compact construction can be achieved by arranging all measuring cells equally spaced about a common centre. In other words, all measuring cells lie on a common circumference.

The four measuring cells of the vertical measuring means, which are offset by 90° each, measure movements in the Z direction and rotations A and B about the X axis or the Y axis, respectively. The measuring cells of the horizontal measuring means, which are arranged in between and are also offset by 90° each, measure the movements in the X and Y direction as well as rotations C about the Z axis. A built-in microcontroller can convert the resulting movement values (U1 . . . U8) into Cartesion values by means of a simple transformation:

| | | | | | | | | | | |
|---|---|---|---|---|---|---|---|---|---|---|
| X | | 0 | +(11/32) | 0 | −¼ | 0 | −(11/32) | 0 | +¼ | |
| Y | | 0 | −¼ | 0 | −(11/32) | 0 | +¼ | 0 | +(11/32) | U1<br>U2 |
| Z | = | +1 | 0 | +1 | 0 | +1 | 0 | +1 | 0 | × U3<br>U4 |
| A | | −1 | 0 | 0 | 0 | +1 | 0 | 0 | 0 | U5<br>U6 |
| B | | 0 | 0 | −1 | 0 | 0 | 0 | +1 | 0 | U7<br>U8 |
| C | | 0 | −1 | 0 | −1 | 0 | −1 | 0 | −1 | |

U1, U3, U5, and U7 are the measuring values of the measuring cells of the vertical measuring means, while U2, U4, U6, and U8 are the measuring values of the measuring cells of the horizontal measuring means, in either case in the clockwise direction. X, Y, and Z are the displacements along the corresponding axes, while A, B, and C are the rotations about these axes.

Furthermore, the measuring cells are arranged in such a manner that at least one privileged direction of the horizontal measuring means and at least one privileged direction of the vertical measuring means include an angle ranging from 14° to 15°, preferably of 14.4°.

As has been found, a further considerable reduction of the calculation expenditure can be achieved by the selection of this angle, compared to all other angles, which is required for the transformation of the measuring results of the horizontal and vertical measuring means into a common Cartesian coordinate system by means of a microcontroller. Here, use is made of the property of the 14.4° angle that both its sine as well as its cosine can be expressed very precisely by multiples of 1/32. In particular, the following holds: arcos (11/32) equals 14.36° and arcsin(¼) equals 14.48°.

The measuring values of the horizontal measuring means have to be multiplied by these values for transforming them to the coordinate system of the vertical measuring means. Multiplications by ¼ or 1/32, respectively, or divisions, respectively, by 4 or 32, respectively, can be realised very fast by bitwise shifting.

The inventive arrangement of the measuring cells allows the values U1 to U8 to be converted very easily into the translations X, Y, and Z and the rotations A, B, and C by means of the above matrix because the matrix includes only factors with amounts of 1, ¼, 11/32, and 0 which can easily be processed.

As measuring cells for the detection of relative movements perpendicular or horizontal, respectively, to the imaginary plane, optoelectronic arrangements are preferably selected. As a first element, they comprise a position sensitive detector (PSD), preferably a position sensitive infrared detector, which is arranged in the beam path of a light emitting means. As a second element the optoelectronic arrangements comprise a slit diaphragm which is arranged in the beam path of the light emitting means and between the light emitting means and the position sensitive detector, so that only a narrow light bar impinges on the downstream PSD. The slit diaphragms of the measuring cells of the horizontal measuring means extend perpendicular to the plane, the slit diaphragms of the measuring cells of the horizontal measuring means extend parallel to the plane.

Each measuring cell is preferably assigned an own light emitting means in the form of an infrared light emitting diode (ILED) which lights radially towards the circumference. There, the ILED's are facing the PSD's. Thus, the beam path extends in a direction originating from the centre.

Due to the fact that each measuring cell is assigned an own light emitting means the output signal of the position sensitive detectors can be used to control the currents of the respective associated light emitting means in such a manner that each position sensitive detector is subjected to the same constant light quantity. This is advantageous in that all six measuring systems are widely unaffected by temperature and aging influences as well as contamination and component tolerances.

In order to be able to measure relative movements one component each of the system light emitting means, slit diaphragm, detector must be movable relative to the other two elements. In the preferred embodiment the light emitting means and the position sensitive detector are mounted stationary on a printed board, while the slit diaphragm is movable relative to them. This is advantageous in that all electronic components can be accommodated on a single printed board (measuring board).

The inventive force and/or moment sensor comprises a first and a second board, with the first and the second board being elastically connected with each other and being movable relative to each other. It also comprises the inventive arrangement for detecting the movements of the first and the second board relative to each other. The boards are preferably printed boards, with the first board (measuring board) carrying all electronic components, in particular the light emitting means and the position dependent detectors, the control electronics for controlling the currents of the light emitting means, amplifiers, if required, a digital unit for data conversion, a power supply unit for the supply of current, and/or other means. By arranging all electronic components on only one printed board, the assembly expenditure during the manufacture is significantly reduced. The printed boards preferably consist of 2 mm thick multilayered fibre glass epoxy resin material.

The two boards are connected by at least one spring means or spring and damping means, preferably from one of the following components or combinations thereof: helical spring, spring assembly, elastomer, cast resin. These spring means or spring and damping means take up the forces and torques. If their elastic properties are known, the forces and torques acting on the two boards can be measured from the relative positions of the two boards.

The two boards are preferably elastically connected with each other by means of four or a multiple of four spring means or spring and damping means. The spring means or spring and damping means are preferably arranged in a rotation symmetrical manner by 90° or 180° about the centre, around which the measuring cells, too, are arranged. This is advantageous in that invariably symmetrical forces are acting in the force and/or moment sensor.

In a preferred embodiment at least one of the spring means or spring and damping means comprises at least one helical spring which at its two opposite ends is securely connected with the first or the second board, respectively, by soldering. In this manner, the helical springs can be loaded in all directions, i.e. tension and compression forces as well as forces acting transversely to the spring can be applied without the springs moving in their seats or even coming out of them.

In a preferred embodiment of the invention the measuring cells are singled to measuring modules each of which comprising at least one measuring means, preferably a pair consisting of a cell of the horizontal measuring means and a cell of the vertical measuring means. Moreover, one of the two boards of each measuring module (measuring board) carries the control electronics for driving the measuring means. The measuring modules of an inventive force and/or moment sensor with such a singled construction preferably also comprise at least one spring means. By way of the singling to measuring modules devices or sensors, respectively, apparatus or sensors, respectively, with very large diameters and a correspondingly high precision can be realised without the need for correspondingly large printed boards. The measuring modules are rather arranged at a corresponding distance about a centre. The digital unit for data conversion and the power supply module can be accommodated on another board (basic board).

Moreover, in a preferred embodiment a current is conducted through the spring means or the spring and damping means, and an interruption of the current flow detects a failure of the spring means or of the spring and damping means. In a preferred embodiment spring means are provided which consist of helical spring assemblies which are connected at their opposite ends with the one or the other board, respectively, and through which a current is conducted. In a preferred embodiment all springs are connected in series so that upon the occurrence of a spring failure of one of the springs a signal can be transmitted to the user. In another preferred embodiment all springs are interconnected in the form of a matrix so that in the case of a spring failure the failed spring can accurately be determined, in order to be able to apply a correction for the defective spring in the evaluation and/or to provide the user with accurate information.

A preferred embodiment of the force and/or moment sensor further comprises at least one stop means which limits the relative movement of the two boards towards each other in the plane and/or perpendicular to the plane. This is preferably realised by stop bolts which are firmly connected with one board. In this manner, the force and/or moment sensor is protected against overload.

From the inventive configuration of the arrangement for detecting the relative movements of two objects the following advantageous properties result:
1. High precision and high measuring rate with low material and construction expenditure;
2. high linearity, low hysteresis, and a large degree of freedom from wear by the application of optoelectronic measuring cells.
3. Most compact design.

From the inventive configuration of the force and/or moment sensor the following advantageous properties results in addition to the above mentioned ones:
1. High overload resistance by the use of stop means.
2. High reliability through the detection of spring failures.

The inventive force and/or moment sensor is suited among other for the measurement of action and reaction forces e.g. in automotive test beds. The detected linear movements and/or rotational deflections can also be converted directly into translatory or rotatory movements. With this, for example, automatic equipment, robots, manipulators, or similar systems can be controlled. For example, for controlling the vertical orientation of a crane or for determining incipient tilt movements, this crane can be mounted on a correspondingly dimensioned platform below which three, four, or more of the inventive force and/or moment sensors are arranged.

A further possible application is to attach the force and/or moment sensor at the end of a robot arm and, for example, at a holding or gripping device which is operated by the robot.

The same result can be achieved if inventive force and/or moment sensors are placed below a robot. Thereby, a force exerted by the robot can be measured as a reaction force and additionally, the exact site can be determined at which the exerted force is applied. Therefore, the inventive force and/or moment sensor need not necessarily be installed in a robot joint or below a robot, but can preferably be arranged above or below a correspondingly dimensioned platform below which a number of, for example, three, four, or more means with one force and/or moment sensor each are arranged, in order to detect the respective reaction forces of the robot and feed them to its control or regulating algorithm.

Further characteristics, properties, advantages, and possible modifications will become apparent for those with skill in the art from the following description of a preferred embodiment in which reference is made to the accompanying drawings.

SHORT DESCRIPTION OF THE DRAWINGS

FIG. 4 shows the connection of the helical springs in a matrix in a circuit diagram section.

DETAILED DESCRIPTION OF AN EMBODIMENT

Figure 1:
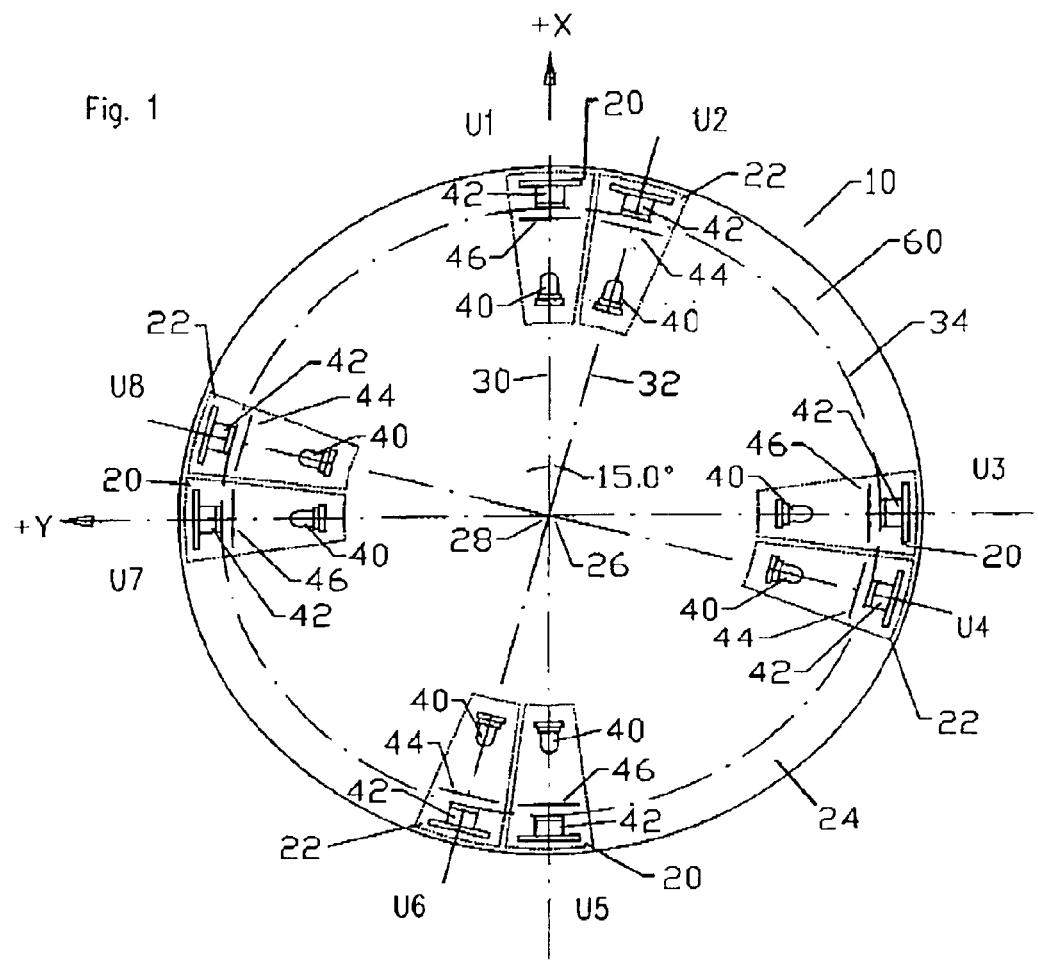
FIG. 1 shows the inventive arrangement for the detection of relative movements of two objects when viewed from above perpendicular to the imaginary plane.

As can be seen from FIG. 1, the four measuring cells of the vertical measuring means 20 in the inventive arrangement for the detection of relative movements of two objects are arranged about a centre 26 in such a manner that the vertical projections of the measuring cells 20 on the imaginary plane 24 have the same angular distance from the projections of the neighbouring measuring cells of the vertical measuring means 20. This means that the projections are oriented along an orthogonal coordinate system. The same applied for the measuring cells of the horizontal measuring means 22. Their projections, too, are oriented along the directions of an orthogonal coordinate system in the plane. The measuring cells of the vertical measuring means 20 and the measuring cells of the horizontal measuring means 22 are further arranged in such a manner that at least one privileged direction 30 of the vertical measuring means and at least one privileged direction 32 of the horizontal measuring means include an angle of 14 to 15°, i.e. of 14.4°.

The measuring cells of the vertical measuring means at their respective site measure movements perpendicular to this plane, i.e. in the viewing direction of FIG. 1. The measuring cells of the horizontal measuring means 22 measure movements in the plane, namely perpendicular to the privileged direction 32 which extends through the respective measuring cell 22.

The measuring cells of the vertical measuring means 20 and of the horizontal measuring means 22 are arranged in such a manner that their vertical projections onto the plane 24 lie on the circumference of a circle 34 about the centre 26, 28.

Figure 2:
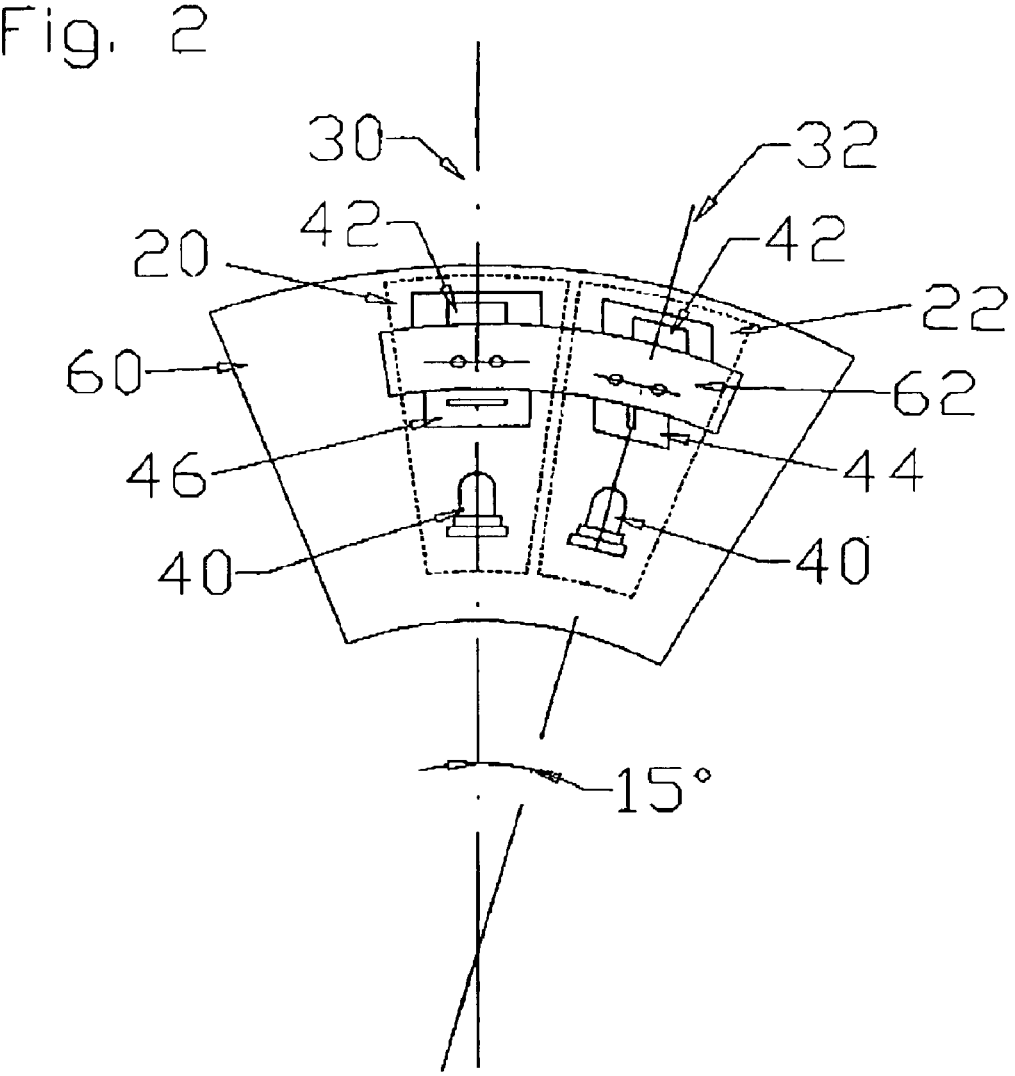
FIG. 2 shows two measuring cells in the preferred embodiment as optoelectronic arrangements with their respective associated light emitting means.

In FIG. 2, the measuring cells 20, 22 are shown in detail in the preferred embodiment as optoelectronic arrangements. Each arrangement comprises a position sensitive infrared detector 42 which is arranged in the beam path of an ILED 40. A slit diaphragm 44, 46 is arranged in the beam path between the ILED 40 and the position sensitive detector 42. The ILED 40 and the position sensitive infrared detector 42 are arranged on a common printed board, and the diaphragm 44, 46 is movable relative to them.

The light emitting means is attached at a defined distance from the position sensitive detector 42. The slit diaphragm 44 or 46, respectively, moves between the light emitting means 40 and the detector 42. It comprises a narrow slit so that only a narrow light strip impinges on the position sensitive detector 42. The slit and thus the light bar extends perpendicular to the measuring direction of the measuring cell. This means that the slit of the slit diaphragm 44 of a measuring cell 20 of the vertical measuring means extends parallel to the plane 24, while the slit of the slit diaphragm 46 of a measuring cell 22 of the horizontal measuring means extends perpendicular to the plane 24.

All position sensitive detectors 42 and ILED's 40 together with the remaining electronic components are accomodated on a printed board 60.

Figure 3:
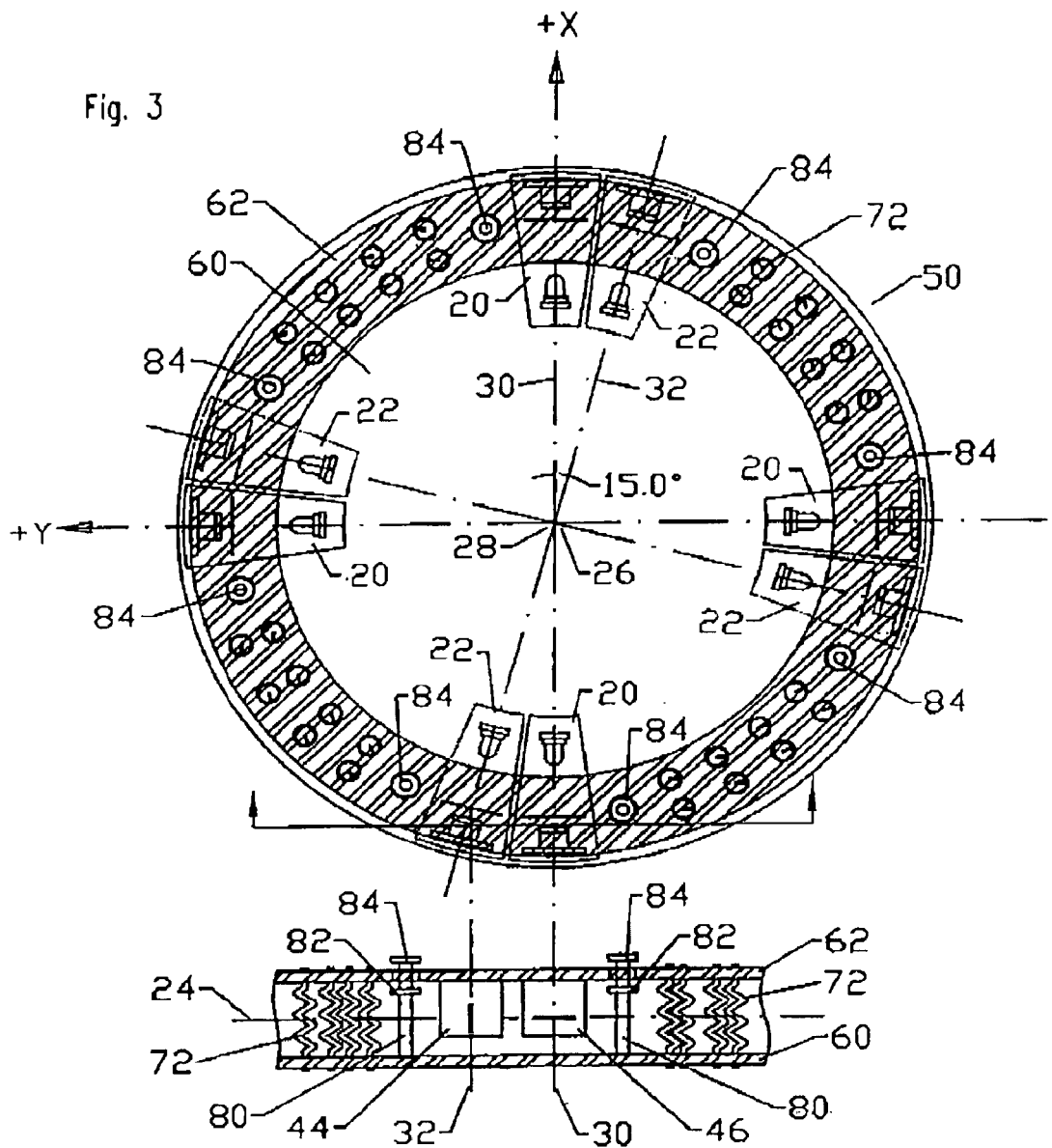
FIG. 3 shows an inventive force and moment sensor in a perspective view.

FIG. 3 depicts a force and/or moment sensor according to the present invention. It consists of a first board 60 and a second board 62 which are elastically connected with each other. It is equipped with the inventive arrangement for the detection of relative movements between the first board 60 and the second board 62. The first board 60 is a printed board to which the position sensitive infrared detectors 42 and the infrared light emitting diodes 40 are firmly soldered. It also carries the remaining electronic components. The slit diaphragms 44, 46 are firmly connected with the second board 62 by soldering.

Spring assemblies of helical springs 72 act as spring means which elastically connect the first board 60 and the second board 62. The helical springs 72 are soldered at their one end to the first board 60 and at their other end with the second board 62. Four spring assemblies are provided which are arranged each between the pair of the closest neighbouring measuring cells 20, 22 of the vertical and the horizontal measuring means. A current is conducted through each helical spring 72. In the case of a failure of a helical spring 72, an interruption of the current is detected in order to signal the user a spring failure and/or to consider the spring failure in the calculation of the resulting forces and moments. In order to be able to identify which spring has failed, the springs are arranged in a matrix circuit 74 as is shown in the printed circuit section in FIG. 4. For this purpose, the second board 62, too, is designed as a printed board.

For the purpose of detecting a failure of one of the springs 72, these can also be connected in series and the current flow through the series connection can be monitored.

For stability reasons, both printed boards are made from 2 mm thick multilayered fibre glass epoxy resin material.

In order to limit the relative movements of the two boards 60, 62 so that any overload cannot result in damage occurring to the force and/or moment sensor 50, four stop means 80 in the form of stop bolts are provided. The stop bolts are securely connected with the first board 60 and project through holes in the second board 62. The horizontal movement of the second board 62 relative to the first board 60 is determined by the diameter of the stop means 80 and the diameters of the holes in the second board 62. The movement of the two boards 60, 62 relative to one another is limited by enlargements 82, 84 at the bolt-shaped stop means 80. The distance of the enlargements 82, 84 from the second board 62 in a vertical direction towards the plane 24 determines the range within which the first board 60 and the second board 62 are movable relative to one another in the vertical direction.

What is claimed is:

1. An arrangement (10) for the detection of relative movements of two objects comprising:
    four measuring cells (20) as vertical measuring means for a detection of a relative movement perpendicular to an imaginary plane (24), with the measuring cells (20) being arranged in such a manner that their vertical projections onto the plane (24) are arranged at an identical angular distance from each other about a centre (26);
    four measuring cells (22) as horizontal measuring means for the detection of a relative movement in the imaginary plane (24), with the measuring cells (22) being arranged in such a manner that their vertical projections onto the plane (24) are arranged at an identical angular distance from each other about a centre (28);
    wherein at least one privileged direction of the horizontal measuring means includes an angle between 14° and 15° with at least one privileged direction of the vertical measuring means.

2. The arrangement according to claim 1, wherein at least one privileged direction of the horizontal measuring means includes an angle of 14.4° with at least one privileged direction of the vertical measuring means.

3. The arrangement according to claim 1, wherein the vertical projections of the measuring cells (20, 22) of the horizontal and the vertical measuring means in the plane lie on a circumference (34) of a circle at an identical angular distance from each other with respect to the centre of the circle.

4. The arrangement (10) according to claim 1, wherein the measuring cells (20, 22) for the detection of relative movements vertical or horizontal, respectively, to the imaginary plane (24) are optoelectronic arrangements, each of which comprises:
    a position sensitive detector (42) arranged in the beam path of a light emitting means (40) as a first element, as well as
    a slit diaphragm (44, 46) arranged in the beam path of the light emitting means (40) between the light emitting means (40) and the position sensitive detector (42) as a second element,
    with a detector axis of the position sensitive detector (42) being oriented perpendicular to a slit means of the slit diaphragm (44, 46), and a element of the system consisting of light emitting means (40), slit diaphragm (44, 46), and detector (42) being movable relative to the other two elements.

5. The arrangement (10) according to claim 4, wherein each measuring cell (20, 22) is assigned an own light emitting means (40).

6. The arrangement (10) according to claim 4 or 5, wherein in each measuring cell (20, 22) the slit diaphragm (44, 46) is movable relative to the position sensitive detector (42) and the light emitting means (40).

7. The arrangement (10) according to claim 4, wherein the position sensitive detectors (42) and the light emitting means (40) of at least one measuring cell (20, 22) are commonly arranged on a printed board (60).

8. A force and/or moment sensor (50), comprising:
    a first board (60); and
    a second board (62), with the first board (60) and the second board (62) being elastically connected with each other and movable relative to one another, and including a means for the detection of movements of the second board (62) relative to the first board (60) according to claim 1.

9. The force and/or moment sensor (50) according to claim 8, wherein the first and second board (60, 62) are connected with each other via at least one spring means or spring and damping means.

10. The force and/or moment sensor (50) according to one of claim 8 or 9, wherein the at least one spring means or spring and damping means comprises one of the following components or combinations therefrom:
    helical spring (72), spring assembly, elastomer, cast resin.

11. The force end/or moment sensor (50) according to claim 8, wherein the first and the second board (60, 62) are elastically connected with each other by means of four or a multiple of four spring means or spring and damping means which are arranged rotation sym-metrically by 90° or 180°.

12. The force and/or moment sensor (50) according to claim 8, wherein at least one of the spring means or spring and damping means comprises at least one helical spring (72) which is securely connected with the first and second board (60, 62) by soldering.

13. The force and/or moment sensor (50) according to claim 4, including a means for detecting a failure of the spring means or of the spring and damping means, which detects an interruption of a current flow through the spring means or the spring and damping means if a failure of the spring means or of the spring and damping means occurs.

14. The force and/or moment sensor (50) according to claim 8, including at least one stop means (80) which limits the relative movement in the plane (24).

15. The force and/or moment sensor (50) according to claim 8, including at least one stop means (80) which limits the relative movement perpendicular to the plane (24).

16. The force and/or moment sensor according to claim 8, including a basic board on which a digital unit for data conversion and/or a power supply unit for the voltage supply is arranged, and at least one measuring module which comprises at least one measuring board, one measuring cell (20, 22), and one spring means or spring and damping means.

* * * * *